US012609027B2

(12) United States Patent
Cho et al.

(10) Patent No.: US 12,609,027 B2
(45) Date of Patent: Apr. 21, 2026

(54) VEHICLE AND CONTROL METHOD THEREOF

(71) Applicants:Hyundai Motor Company, Seoul (KR); Kia Corporation, Seoul (KR)

(72) Inventors: Jeongmin Cho, Hwaseong (KR); Jaewoong Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/772,523

(22) Filed: Jul. 15, 2024

(65) Prior Publication Data

US 2024/0371267 A1 Nov. 7, 2024

Related U.S. Application Data

(62) Division of application No. 17/888,158, filed on Aug. 15, 2022, now abandoned.

(30) Foreign Application Priority Data

Aug. 27, 2021 (KR) ........................ 10-2021-0114048

(51) Int. Cl.
| | |
|---|---|
| *G08G 1/0967* | (2006.01) |
| *B60W 30/06* | (2006.01) |
| *B60W 40/06* | (2012.01) |
| *G08G 1/0965* | (2006.01) |
| *G08G 1/0969* | (2006.01) |
| *G08G 1/14* | (2006.01) |

(52) U.S. Cl.
CPC ....... *G08G 1/096725* (2013.01); *B60W 30/06* (2013.01); *B60W 40/06* (2013.01); *G08G 1/0965* (2013.01); *G08G 1/0969* (2013.01); *G08G 1/144* (2013.01); *B60W 2556/50* (2020.02); *B60W 2556/65* (2020.02)

(58) Field of Classification Search
CPC .......... G08G 1/096725; G08G 1/0965; G08G 1/0969; G08G 1/144; G08G 1/096827; B60W 30/06; B60W 40/06; B60W 2556/50; B60W 2556/65
See application file for complete search history.

(56) References Cited

U.S. PATENT DOCUMENTS

| | | |
|---|---|---|
| 6,792,351 B2 | 9/2004 | Lutter |
| 9,360,335 B1 | 6/2016 | Powelson et al. |
| 9,841,767 B1 | 12/2017 | Hayward |
| 10,008,111 B1 | 6/2018 | Grant |
| 10,565,873 B1 | 2/2020 | Christensen |
| 2007/0040700 A1 | 2/2007 | Bachelder |
| 2010/0004958 A1 | 1/2010 | Ackermann et al. |
| 2011/0018736 A1 | 1/2011 | Carr |

(Continued)

*Primary Examiner* — Nay Tun
(74) *Attorney, Agent, or Firm* — Fox Rothschild LLP

(57) ABSTRACT

Provided is a control method of a vehicle comprising a communicator configured to receive emergency vehicle information from outside, the control method including: receiving the emergency vehicle information and acquiring an emergency route of an emergency vehicle from the emergency vehicle information; comparing the emergency route with a first movement path of the vehicle; and changing from the first movement path to a second movement path, when at least a portion of the emergency route is identical to at least a portion of the first movement path as a result of the comparison.

9 Claims, 7 Drawing Sheets

(56)     References Cited

U.S. PATENT DOCUMENTS

| | | |
|---|---|---|
| 2012/0303264 A1 | 11/2012 | Su et al. |
| 2015/0254978 A1 | 9/2015 | Mawbey et al. |
| 2016/0093213 A1 | 3/2016 | Rider et al. |
| 2016/0169688 A1 | 6/2016 | Kweon et al. |
| 2016/0223351 A1 | 8/2016 | Sasse et al. |
| 2017/0192429 A1 | 7/2017 | Tseng et al. |
| 2019/0126942 A1 | 5/2019 | Goto et al. |
| 2020/0005642 A1* | 1/2020 | Kim ........................ G08G 1/145 |
| 2020/0182636 A1 | 6/2020 | Ningthoujam |
| 2020/0307634 A1* | 10/2020 | Yashiro ............. B60W 60/0018 |
| 2022/0410937 A1* | 12/2022 | Parasuram ...... B60W 60/00272 |

* cited by examiner

VEHICLE AND CONTROL METHOD THEREOF

CROSS-REFERENCES TO RELATED APPLICATIONS

This Application is a Division of application Ser. No. 17/888,158 filed on Aug. 15, 2022. Application Ser. No. 17/888,158 claims the benefit of Korean Patent Application No. 10-2021-0114048 filed on Aug. 27, 2021 in the Korean Intellectual Property Office (KIPO), the entire contents of each of which are incorporated herein by reference.

The entire contents of these applications are incorporated herein by reference in their entirety.

BACKGROUND

1. Technical Field

The disclosure relates to a vehicle and a control method thereof, and more specifically, to a vehicle and a control method thereof that may determine a movement path of an autonomous vehicle.

2. Background Art

An autonomous vehicle may drive using sensors mounted on the vehicle and external factors without driver's operation. Autonomous driving may be divided into an automated driving that requires a driver's control to some extent and a fully automated driving that may arrive at a destination without any driver intervention except for inputting the destination only.

In the latter case, an autonomous vehicle travels along a specific route while avoiding a collision through sensors mounted on the vehicle. In general, however, an autonomous vehicle detects only obstacles in front or on the sides of the vehicle, not the obstacle at the rear of the vehicle.

When an emergency vehicle such as an ambulance approaches from behind, an autonomous vehicle may not consider the emergency vehicle as an object to be avoided, impeding a smooth traffic flow.

SUMMARY

An aspect of the disclosure provides a vehicle and a control method thereof that may not disrupt the driving of an emergency vehicle.

Additional aspects of the disclosure will be set forth in part in the description which follows and, in part, will be obvious from the description, or may be learned by practice of the disclosure.

According to an aspect of the disclosure, there is provided a control method of a vehicle including a communicator configured to receive emergency vehicle information from outside, the control method including: receiving the emergency vehicle information and acquiring an emergency route of an emergency vehicle from the emergency vehicle information; comparing the emergency route with a first movement path of the vehicle; and changing from the first movement path to a second movement path, when at least a portion of the emergency route is identical to at least a portion of the first movement path as a result of the comparison.

The control method further includes controlling the vehicle to travel based on the second movement path.

The control method further includes outputting a guide for the second movement path on a display.

The control method further includes receiving an on/off input with respect to a route change mode based on the emergency vehicle information from a user; and automatically changing from the first movement path to the second movement path, when the route change mode is on.

The automatically changing from the first movement path to the second movement path includes providing a guide for a route change to the user, and when a response from the user is not received for a predetermined period of time, automatically changing from the first movement path to the second movement path.

The control method further includes receiving an on/off input with respect to a route change mode based on the emergency vehicle information from a user; and maintaining the first movement path, when the route change mode is off.

The changing from the first movement path to the second movement path includes, when the at least a portion of the emergency route is identical to the at least a portion of the first movement path, determining an identical portion, and when an entry time of the vehicle is earlier than an entry time of the emergency vehicle in the identical portion, changing from the first movement path to the second movement path.

The changing from the first movement path to the second movement path includes, when the at least a portion of the emergency route is identical to the at least a portion of the first movement path, determining an identical portion, and when an entry time of the vehicle is later than an entry time of the emergency vehicle in the identical portion, not changing from the first movement path to the second movement path.

According to another aspect of the disclosure, there is provided a control method of a vehicle including a communicator configured to receive emergency vehicle information from outside, the control method including: receiving the emergency vehicle information while the vehicle is parked or stopped, and acquiring an emergency route of an emergency vehicle from the emergency vehicle information; and acquiring a current location of the vehicle, and when the current location of the vehicle is included in the emergency route, controlling the vehicle to move to a location other than the current location. In other words, when the location of the parked or otherwise stopped (stationary) vehicle is included or overlaps with the emergency route (e.g. the emergency is taking the same road where the vehicle is stopped or parked), the vehicle is controlled such as by a controller to move to a different location such that there is not overlap with the emergency route. In such manner, obstruction or interruption of the emergency route by the emergency route can be avoided.

The control method further includes controlling the communicator to provide a user terminal with a message about the emergency vehicle, when the current location of the vehicle is included in the emergency route.

The message includes selection information to guide a user on a movement of the vehicle.

The control method further includes moving the vehicle, when the user allows the vehicle to move in response to the selection information.

The control method further includes searching for a nearby parking lot based on the current location of the vehicle; and controlling the communicator to output the nearby parking lot on the user terminal.

The control method further includes receiving a user's selection on the nearby parking lot, and controlling the vehicle to move to the selected parking lot.

The control method further includes controlling the communicator to output a movement completion notification on the user terminal, when a movement of the vehicle to the selected parking lot is completed.

The control method further includes receiving an on/off input with respect to a movement mode based on the emergency vehicle information from a user; and controlling the vehicle to move to the location other than the current location, when the movement mode is on.

The controlling of the vehicle to move to the location other than the current location includes providing a guide for a movement of the vehicle to a user terminal, and when a response from the user terminal is not received for a predetermined period of time, controlling the vehicle to automatically move to the location other than the current location.

The control method further includes identifying a width of a road of the current location of the vehicle; and controlling the vehicle not to move, when the width of the road is equal to or greater than a predetermined length.

As discussed, the method and systems suitably include use of a controller or processer.

Thus, for instance, methods are provided that include a control method of a vehicle comprising a communicator configured to receive emergency vehicle information from outside the vehicle, the control method comprising: a) receiving the emergency vehicle information and acquiring an emergency route of an emergency vehicle from the emergency vehicle information; comparing the emergency route with a first movement path of the vehicle; and changing from the first movement path to a second movement path, when at least a portion of the emergency route is identical to at least a portion of the first movement path as a result of the comparison, wherein one or more of the above steps may comprise use or a controller or processor. Such methods may further comprise controlling via a controller or processor the vehicle to travel based on the second movement path; and/or outputting via a controller or processor a guide for the second movement path on a display; and more via a controller or processor receiving an on/off input with respect to a route change mode based on the emergency vehicle information from a user; and/or automatically changing from the first movement path to the second movement path, when the route change mode is on.

In another aspect, a control method of a vehicle comprising a communicator configured to receive emergency vehicle information from outside the vehicle, the control method comprising: a) receiving the emergency vehicle information while the vehicle is parked or stopped, and acquiring an emergency route of an emergency vehicle from the emergency vehicle information; and b) acquiring a current location of the vehicle, and when the current location of the vehicle is included in the emergency route, controlling the vehicle to move to a location other than the current location, wherein one or more of the above steps may comprise use or a controller or processor.

In another embodiment, vehicles are provided that comprise the vehicle control apparatus and/or method as disclosed herein. The vehicle may further comprise a sensor device configured to detect surrounding environment; recognize vehicle information; and communicate with the memory, the communication device and the processor.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
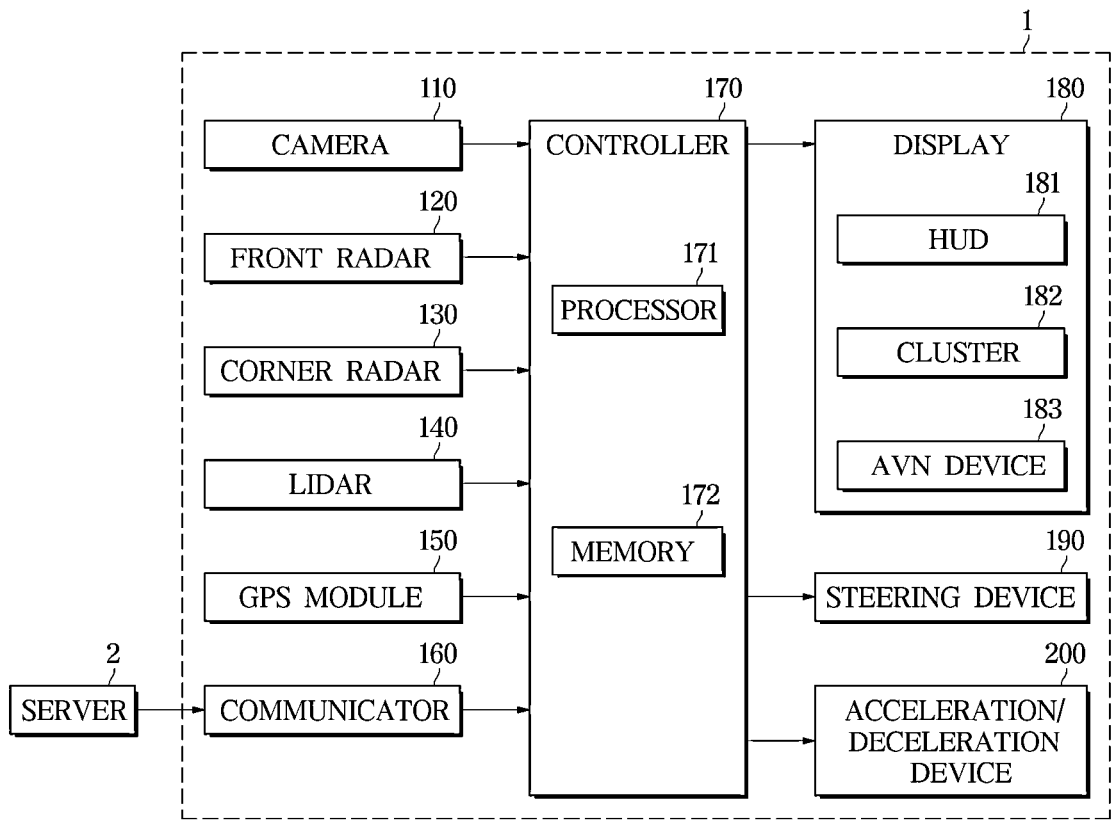
FIG. 1 is a control block diagram illustrating a vehicle according to an exemplary embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It will be understood that, although the terms first, second, etc. may be used herein to describe various elements, these elements should not be limited by these terms.

It is to be understood that the singular forms are intended to include the plural forms as well, unless the context clearly dictates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference numerals used for method steps are just used for convenience of explanation, but not to limit an order of the steps. Thus, unless the context clearly dictates otherwise, the written order may be practiced otherwise.

Hereinafter, an operation principle and exemplary embodiments will be described in detail with reference to the accompanying drawings.

FIG. 1 is a control block diagram illustrating a vehicle according to an embodiment.

A vehicle 1 according to an embodiment of the disclosure may be implemented by performing transmission/reception with a server 2 via a network. The vehicle 1 is equipped with an autonomous driving system, and may drive while avoiding an obstacle without a driver's (user's) operation. Also, when the driver inputs a destination only, the vehicle 1 may generate a driving route and travel along the driving route.

The server 2 may be provided in a control center that controls an emergency vehicle, and transmit emergency vehicle information to an outside through wireless communication. The emergency vehicle refers to a vehicle required to reach a destination in the fastest possible time due to its special purpose, e.g., fire trucks, police cars, ambulances, and the like.

The vehicle 1 may acquire the emergency vehicle information transmitted by the server 2 through a communicator 160. Also, the vehicle 1 may acquire the emergency vehicle information directly or indirectly through a vehicle-to-everything (V2X) communication, in addition to the server 2.

The emergency vehicle information includes various information that the vehicle 1 is required to refer to in autonomous driving, such as a type of emergency vehicle, an emergency route for the vehicle 1 to reach a destination faster, and the like.

The vehicle 1 includes a camera 110, a front radar 120, a plurality of corner radars 130, a lidar 140, a global positioning system (GPS) module 150 and the communicator 160.

The camera 110 may include a front camera (not shown) that has a field of view facing a front of the vehicle 1 and a side camera (not shown) that has a field of view facing sides of the vehicle 1. In this instance, the front camera may detect a moving object in front of the vehicle 1, or a plurality of parked vehicles in the front and sides of the vehicle 1.

The front camera may be installed in a front windshield of the vehicle 1. The front camera may photograph the front of the vehicle 1 to acquire image data of the front of the vehicle 1. The image data of the front of the vehicle 1 may include information about at least one of other vehicles, pedestrians, cyclists, lanes, curbs, guardrails, street trees, or street lights located in front of the vehicle 1.

The camera 110 may capture a movement of another vehicle located in front of the vehicle 1, thereby detecting an occurrence of an accident. Specifically, the camera 110 may provide the image data to a controller 170, and the controller 170 may process the image data, identify that the accident has occurred when the movement of the other vehicle located in front of the vehicle 1 is not detected for a predetermined period of time, and identify that the accident vehicle may not drive.

The camera 110 may include a plurality of lens and image sensors. The camera 110 may transmit image data on external fields of view to the controller 170.

The front radar 120 may have a field of sensing 120a facing the front of the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an obstacle.

The front radar 120 may acquire front radar data from the transmission wave transmitted by the transmission antenna and the reflected wave received by the receiving antenna.

The front radar data may include location information and speed information about the other vehicles, pedestrians or cyclists located in front of the vehicle 1.

The front radar 120 may calculate a relative distance to the obstacle based on a phase difference (or a time difference) between the transmission wave and the reflected wave, and calculate a relative speed of the obstacle based on a frequency difference between the transmission wave and the reflected wave. The front radar 120 may transmit the front radar data to the controller 170.

The plurality of corner radars 130 include a first corner radar (not shown) installed on a front right side of the vehicle 1, a second corner radar (not shown) installed on a front left side of the vehicle 1, a third corner radar (not shown) installed on a rear right side of the vehicle 1, and a fourth corner radar (not shown) installed on a rear left side of the vehicle 1.

The first corner radar (not shown) may have a field of sensing facing the front right side of the vehicle 1, and may be installed on a right side of a front bumper of the vehicle 1.

The second corner radar (not shown) may have a field of sensing facing the front left side of the vehicle 1, and may be installed on a left side of the front bumper of the vehicle 1.

The third corner radar (not shown) may have a field of sensing facing the rear right side of the vehicle 1, and may be installed on a right side of a rear bumper of the vehicle 1.

The fourth corner radar (not shown) may have a field of sensing facing the rear left side of the vehicle 1, and may be installed on a left side of the rear bumper of the vehicle 1.

Each of the first to fourth corner radars may include a transmission antenna and a receiving antenna.

The first to fourth corner radars may acquire first corner radar data, second corner radar data, third corner radar data, and fourth corner radar data, respectively.

The first corner radar data may include distance information and speed information about other vehicles, pedestrians, or cyclists located on the front right side of the vehicle 1.

The second corner radar data may include distance information and speed information about obstacles located on the front left side of the vehicle 1.

The third and fourth corner radar data may include distance information and speed information about obstacles located on the rear right side or and the rear left side of the vehicle 1.

Each of the first to fourth corner radars may transmit the first to fourth corner radar data to the controller 170.

That is, the front radar and the corner radars are an obstacle detector to detect an obstacle located on the front, right and left sides of the vehicle 1, and transmit obstacle information about the detected obstacle to the controller 170. Here, the obstacle information may include location information of the obstacle, and the location information of the obstacle may include distance information to the obstacle and direction information of the obstacle.

The lidar 140 may be installed on the vehicle 1 to view an outside of the vehicle 1. For instance, the lidar 140 may be mounted on the front bumper, a radiator grille, a hood, a roof, doors, side mirrors, a tailgate, a trunk lid or a fender.

The GPS module 150 may detect location information and time information of the vehicle 1. The GPS module 150 may detect distance information from a satellite and time information at which the distance information is measured, and then detect three-dimensional (3D) location information according to latitude, longitude, and altitude by applying triangulation to the detected distance information. Afterwards, the GPS module 150 may transmit the location information and the time information to the controller 170.

The communicator 160 may transmit/receive various information through communication with the server 2. The communicator 160 may receive the location information received from the GPS module 150 and identify a current location (area) of the vehicle 1 based on the location information. Also, the communicator 160 may identify in which lane the vehicle 1 is travelling in the current area and provide lane information to the controller 170.

The communicator 160 may include a vehicle-to-vehicle (V2V) communication module (not shown) for wireless communication between vehicles and a vehicle-to-infra (V2I) communication module (not shown) for wireless communication between vehicle and traffic infrastructure, without being limited thereto. The communicator 160 may further include a vehicle-to-pedestrian (V2P) communication module for communication between vehicle and pedestrian and a vehicle-to-nomadic devices (V2N) communication module for communication between vehicle and personal terminal.

The communicator 160 may transmit a message generated by the vehicle 1 to a user terminal (not shown) possessed by the driver, and receive various control signals from the user terminal. Here, the user terminal refers to a wireless device possessed by the user that uses the vehicle 1. For example, the user terminal includes all types of mobile terminals capable of performing wireless communication with a server such as a smart phone, a smart watch, etc. An application for the user to use the vehicle 1 is installed in the user terminal and the user may transmit/receive various information through the application linked to a program mounted on the vehicle 1.

The controller 170 may control the vehicle 1 to travel along a regular route stored in a memory 172.

The controller 170 may include a processor 171 including an image signal processor for processing the image data of the camera 110 and/or a digital signal processor for processing the radar data of the radars 120 and 130 and/or a micro control unit (MCU) for generating a brake signal.

In an autonomous driving mode, when image information (i.e. image data) is received from the camera 110, the controller 170 may recognize a lane of a road by image processing, and recognize a lane in which the vehicle 1 is travelling based on location information of the recognized lane. Also, the controller 170 may identify whether both lanes of the lane in which the vehicle 1 is travelling are recognized, and when it is identified that both lanes are recognized, the controller 170 may control autonomous driving based on the recognized both lanes. In addition, the controller 170 may acquire lane information of the lane in which the vehicle 1 is travelling by image processing.

The controller 170 may detect obstacles (e.g. other vehicles, pedestrians, cyclists, lanes, curbs, guardrails, street trees, street lights, and the like) located in front of the vehicle 1, based on the image data of the camera 110 and the front radar data of the front radar 120.

Specifically, the controller 170 may acquire location information (distance and direction) and speed information (relative speed) of the obstacles located in front of the vehicle 1 based on the front radar data of the front radar 120.

The controller 170 may acquire location information (direction) and type information (e.g. whether the obstacle is another vehicle, pedestrian, cyclist, curb, guardrail, street tree, street light, or the like) of the obstacles located in front of the vehicle 1 based on the image data of the camera 110.

The memory 172 may store a program and/or data to process the image data, a program and/or data to process the radar data, and a program and/or data for the processor 171 to generate the brake signal and/or a warning signal.

The memory 172 may temporarily store the image data received from the camera 110, the radar data received from the radars 120 and 130, and/or processing results of the image data and/or the radar data of the processor 171.

The controller 170 may control the vehicle 1 by transmitting a control signal to a steering device 190 and an acceleration/deceleration device 200. When the vehicle 1 is an autonomous driving vehicle, the controller 170 may transmit the control signal to the steering device 190 and/or the acceleration/deceleration device 200 based on data processed by the camera 110, the front radar 120, the plurality of corner radars 130, etc.

For instance, the steering device 190 may include a steering wheel, an actuator linked to the steering wheel, and a controller for controlling the actuator, and be controlled by the driver and/or an autonomous driving system.

The acceleration/deceleration device 200 may be configured to control acceleration of the vehicle 1. For example, the acceleration/deceleration device 200 may include a throttle, an actuator linked to the throttle, and a controller for controlling the actuator linked to the throttle, and be controlled by the driver and/or the autonomous driving system. Also, the acceleration/deceleration device 200 may be configured to control deceleration of the vehicle 1. For example, the acceleration/deceleration device 200 may include a brake, an actuator linked to the brake, and a controller for controlling the actuator linked to the brake, and be controlled by the driver and/or the autonomous driving system.

The memory 172 may be implemented with at least one of a volatile memory such as a random access memory (RAM), a non-volatile memory such as a cache, a read only memory (ROM), a programmable read only memory (PROM), an erasable programmable read only memory (EPROM), an electrically erasable programmable read only memory (EEPROM), a flash memory, and storage medium such as a hard disk drive (HDD) and a compact disc read only memory (CD-ROM), without being limited thereto.

In the above, a system in which the server 2 according to an embodiment of the disclosure is implemented and each constituent component of the system have been described. Hereinafter, a control method implemented by the server 2 based on each of the above-described constituent components is described in detail.

Figure 2:
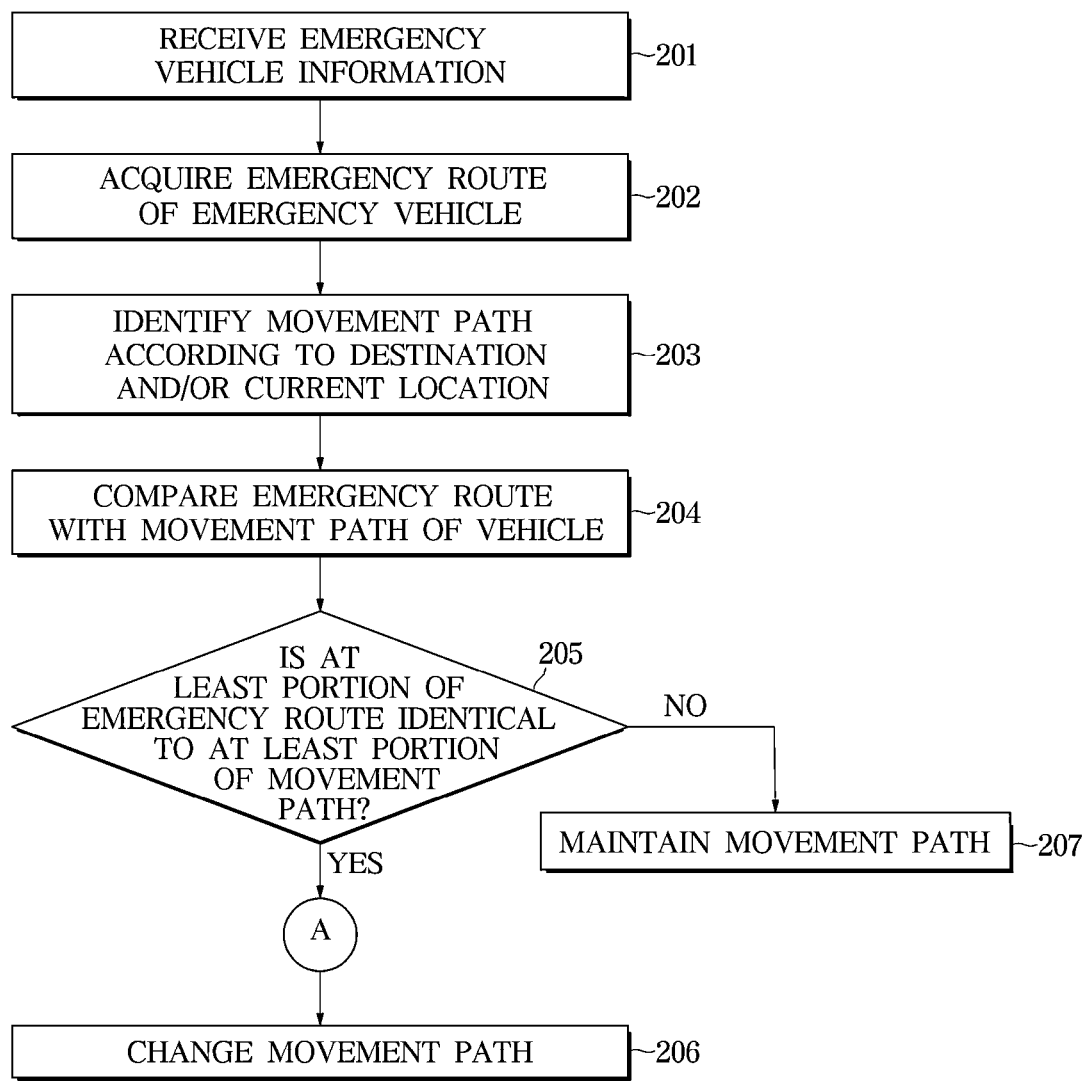
FIG. 2 is a flowchart illustrating a control method of a vehicle according to an exemplary embodiment.
Figure 3:
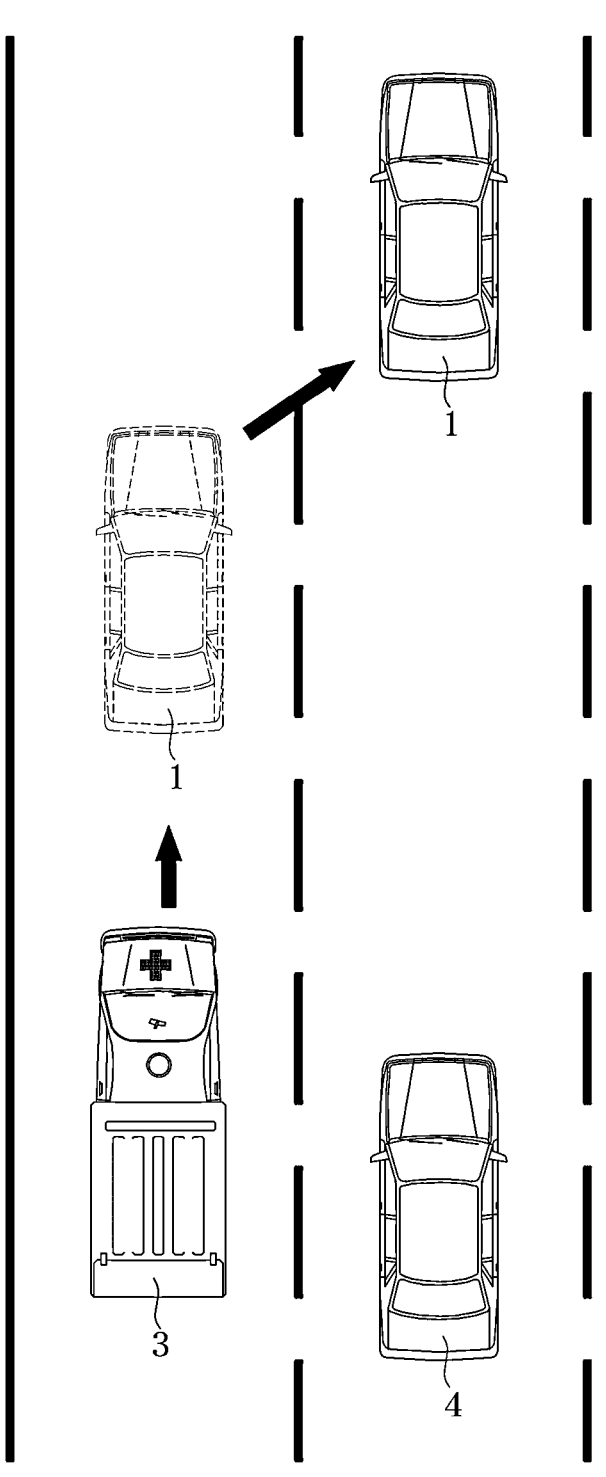
FIG. 3 is a diagram illustrating an example where a vehicle yields a driving route to an emergency vehicle during driving according to an exemplary embodiment.

FIG. 2 is a flowchart illustrating a control method of a vehicle according to an embodiment, and FIG. 3 is a diagram illustrating an example where the vehicle 1 yields a driving route to an emergency vehicle during driving according to an embodiment. The flowchart of FIG. 2 is described with reference to FIG. 3.

The vehicle 1 receives emergency vehicle information (201). The vehicle 1 transmits the emergency vehicle information received through the communicator 160 to the controller 170. The emergency vehicle information may be received from the above-described server 2 or a variety of external devices capable of performing V2X communication.

The vehicle 1 acquires an emergency route of an emergency vehicle 3 (202). The emergency route corresponds to a route for the emergency vehicle 3 to reach a destination for a special purpose. Information about the emergency route may include information about a time of each location of the emergency vehicle 3 on a corresponding route.

The vehicle 1 identifies a movement path according to a destination and/or a current location (203). The movement path to the destination may be generated by a user inputting the destination through an inputter (not shown) of the vehicle 1.

The vehicle 1 compares the emergency route of the emergency vehicle 3 with the movement path of the vehicle 1 (204). Specifically, the vehicle 1 may predict a case where the vehicle 1 is required to avoid the emergency vehicle 3 due to an overlap portion between the emergency route and the movement path.

When at least a portion of the emergency route is identical to at least a portion of the movement path (205), the vehicle 1 may change the movement path (206). In this instance, the change of the movement path may include using a road completely different from the emergency route or using different lanes on the same road. For instance, as shown in FIG. 3, the vehicle 1 may change the movement path by moving to the second lane where another vehicle 4 is travelling, so that the emergency vehicle 3 may go first in the first lane. Also, when the emergency vehicle 3 approaches from behind on one-way road, the vehicle 1 may move to the left or right side to let the emergency vehicle 3 through. In addition to the above, the vehicle 1 may change the movement path in various manners so that the emergency vehicle 3 may go first in various traffic environments.

According to an embodiment, the vehicle 1 may output a guide for the movement path on a display 180 (refer to FIG. 1), in addition to changing the movement path.

When the at least a portion of the emergency route is not identical to the at least a portion of the movement path (205), the vehicle 1 may maintain the movement path (207).

Meanwhile, even when the emergency route of the emergency vehicle 3 overlaps the movement path of the vehicle 1, the vehicle 1 is not required to change the movement path when the emergency vehicle 3 passes by the vehicle 1 earlier at a certain point. Accordingly, according to an embodiment, when the at least a portion of the emergency route is identical to the at least a portion of the movement path, the vehicle 1 may identify the identical portion, and when an entry time of the vehicle 1 is earlier than an entry time of the emergency vehicle 3 in the identical portion, the vehicle 1 may be controlled to change the movement path. By contrast, when the at least a portion of the emergency route is identical to the at least a portion of the movement path, the vehicle 1 may identify the identical portion, and when the entry time of the vehicle 1 is later than an entry time of the emergency vehicle 3 in the identical portion, the vehicle 1 may be controlled to maintain the movement path.

The vehicle 1 may drive based on the existing movement path or the changed movement path.

Meanwhile, the change or maintenance of the movement path according to the embodiment of FIG. 2 may be determined according to the user's setting, which will be described in detail with reference to FIG. 4.

Figure 4:
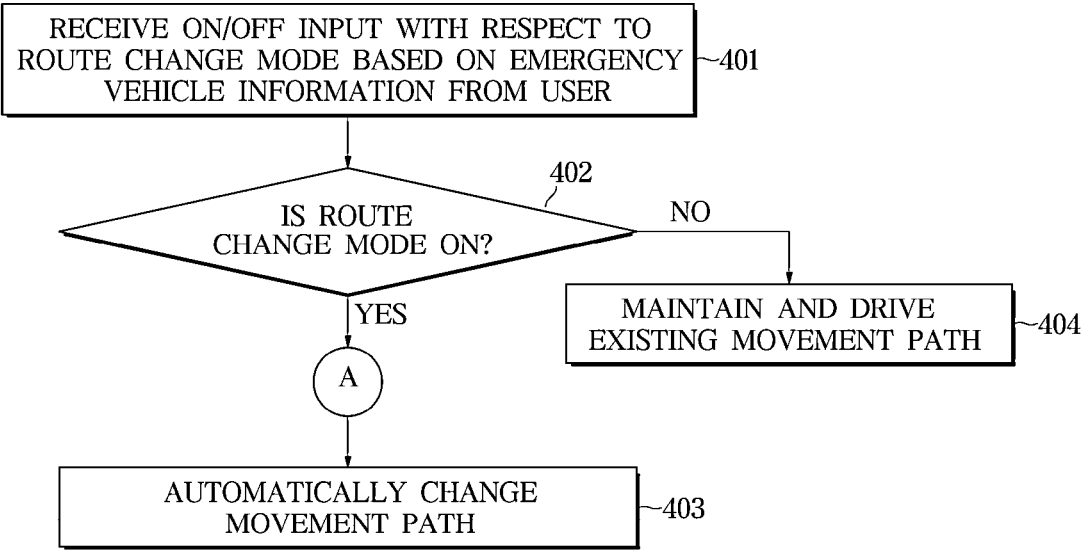
FIG. 4 is a flowchart illustrating operations of a control method of a vehicle according to a route change mode according to an exemplary embodiment.

FIG. 4 is a flowchart illustrating operations of a control method of a vehicle according to a route change mode according to an embodiment. The embodiment of FIG. 4 is not independent of the embodiment of FIG. 2, and corresponds to a control process that may be performed additionally to the embodiment of FIG. 2.

The vehicle 1 receives an on/off input with respect to a route change mode based on emergency vehicle information from a user (401). When the emergency vehicle 3 approaches from behind, the vehicle 1 may automatically change a movement path regardless of a user's intention according to a user's setting. Also, when the emergency vehicle 3 approaches from behind, the vehicle 1 may change the movement path through the user's operation according to the user's setting.

According to an embodiment, when the route change mode is on (402), the vehicle 1 may change the movement path automatically (403). In this instance, when the emergency vehicle 3 is within a predetermined distance from a rear of the vehicle 1, the vehicle 1 may automatically change the movement path, without a guide or after providing a guide for the movement path change. In addition, according to an embodiment, the vehicle 1 waits for a response from the user for a predetermined period of time in order to provide the guide for the movement path change and reconfirm the user's intention. When no response is received from the user, the vehicle 1 may automatically change the movement path.

By contrast, when the route change mode is off (402), the vehicle 1 may be controlled to maintain and drive the existing movement path (404).

In the above, an autonomous driving control for ensuring a rapid movement of the emergency vehicle 3 while the vehicle 1 is travelling has been described. Hereinafter, an autonomous driving control for a rapid movement of the emergency vehicle 3 even when the vehicle 1 is not travelling, for example, when the vehicle 1 is parked in a narrow road as shown in FIG. 6, is described with reference to FIGS. 5 and 7.

Figure 5:
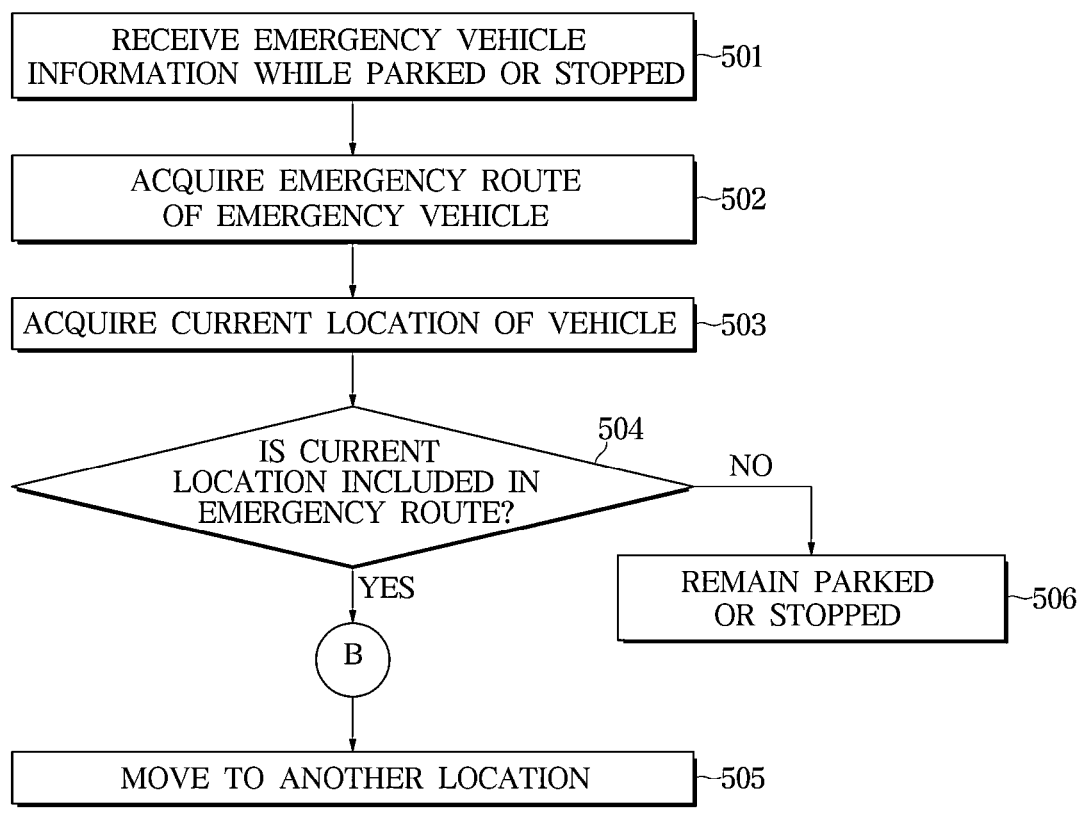
FIG. 5 is a flowchart illustrating a control method of a vehicle according to an exemplary embodiment.
Figure 6:
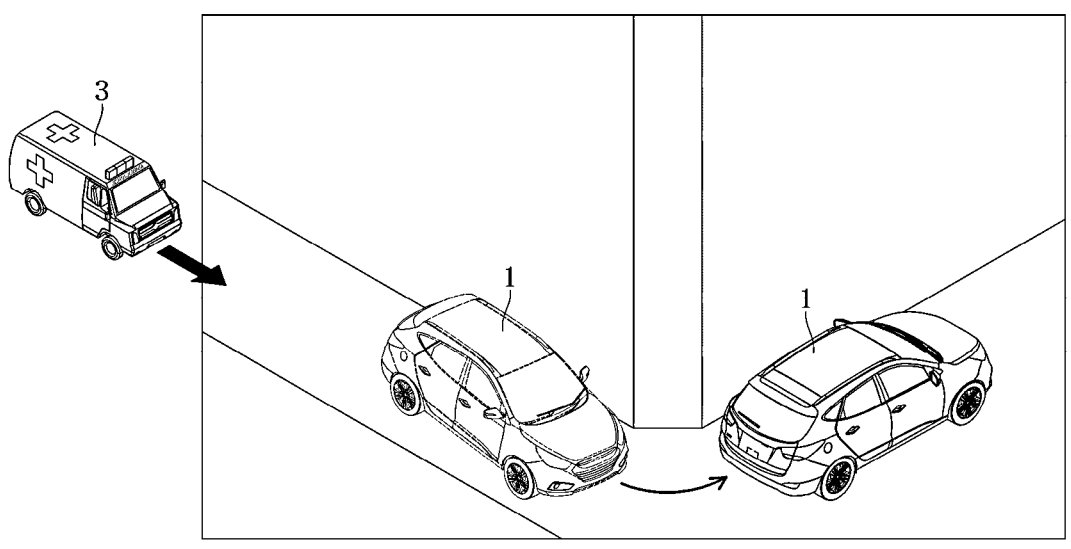
FIG. 6 is a diagram illustrating an example where a vehicle generates a driving route that enables an emergency vehicle to pass while being parked according to an exemplary embodiment.

FIG. 5 is a flowchart illustrating a control method of a vehicle according to an embodiment.

The vehicle 1 receives emergency vehicle information while parked or stopped (501). The vehicle 1 receives the emergency vehicle information through the communicator 160 and transmits the emergency vehicle information to the controller 170. The emergency vehicle information may be received from the above-described server 2 or from various external devices capable of performing V2X communication.

The vehicle 1 acquires an emergency route of the emergency vehicle 3 (502). The emergency route corresponds to a route for the emergency vehicle 3 to reach a destination for a special purpose. Information about the emergency route may include information about a time of each location of the emergency vehicle 3 on a corresponding route.

The vehicle 1 acquires a current location of the vehicle 1 (503). The current location may be acquired by detecting location information and time information through the GPS module 150, and the vehicle 1 may identify whether the emergency vehicle 3 may sufficiently move in an area where the vehicle 1 is located, based on the current location.

The vehicle 1 identifies whether the current location is included in the emergency route (504). When the vehicle 1 is parked on a route in which the emergency vehicle 3 travels, the emergency vehicle 3 may not pass by. When the user is away from the vehicle 1 or the vehicle 1 may not be moved within a predetermined period of time, making an emergency situation worse. Accordingly, according to an embodiment, when it is predicted that the emergency vehicle 3 moves via a place where the vehicle 1 is located, the vehicle 1 may move to another location other than the current location without the user's operation, so that the emergency vehicle 3 may move rapidly.

According to an embodiment, when the current location is included in the emergency route, the vehicle 1 may be controlled to move to the other location other than the current location (505). Also, the vehicle 1 may control the communicator 160 to provide a user terminal possessed by the user with a message about the emergency vehicle 3, in order to notify the user of the movement of the vehicle 1 simultaneously or before and after the vehicle 1 moves. In this instance, the message includes information guiding the movement of the vehicle 1 so that the vehicle 1 moves after gaining an approval from the user. In addition, according to an embodiment, the vehicle 1 may search for a parking lot around the vehicle 1 in order to move to an appropriate place, and provide information about the retrieved parking lots to the user by including the information in the message so that the user may select one from the retrieved parking lots.

When the current location of the vehicle 1 is not included in the emergency route (504), the vehicle 1 may remain parked or stopped (506).

Further, according to an embodiment, the vehicle 1 may identify a road width of the current location, and when the road width is equal to or greater than a predetermined length, the vehicle 1 may not move.

Meanwhile, according to the embodiment of FIG. 5, the vehicle 1 may change or maintain the parked (or stopped) state according to a user's setting, which is described in detail with reference to FIG. 7.

Figure 7:
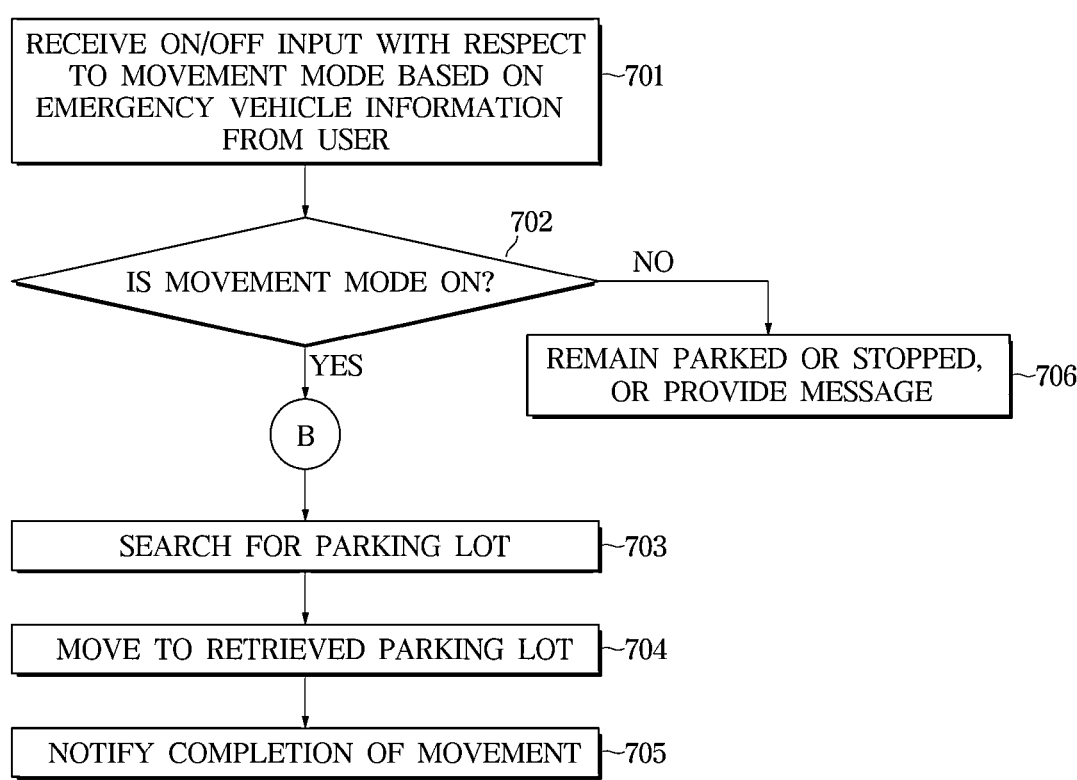
FIG. 7 is a flowchart illustrating a control method of a vehicle according to a movement mode.

FIG. 7 is a flowchart illustrating a control method of a vehicle according to a movement mode. The embodiment of FIG. 7 is not independent of the embodiment of FIG. 5, and corresponds to a control process that may be performed additionally to the embodiment of FIG. 5.

The vehicle 1 receives an on/off input with respect to a movement mode based on emergency vehicle information from a user (701). When the emergency vehicle 3 approaches from behind while the vehicle 1 is parked (or stopped), the vehicle 1 may automatically move to another location other than a current location of the vehicle 1 regardless of a user's intention according to a user's setting. In the embodiment, although a parking lot is used as an example, a place where the vehicle 1 moves is not limited thereto, and may include any place where the vehicle 1 may be parked or stopped.

According to an embodiment, when the movement mode is on (702), the vehicle 1 may be controlled to move to the other location from the current location. First, the vehicle 1 may search for a parking lot around the vehicle 1 (703) in order to select an appropriate place for parking (or stopping). In this instance, the vehicle 1 may control the communicator 160, so that the user may select one from the retrieved parking lots through a user terminal possessed by the user.

The vehicle 1 moves to the retrieved parking lot (704). In this instance, the vehicle 1 may move to the parking lot selected through the user terminal, or an arbitrary parking lot when no user input is received.

According to an embodiment, the vehicle 1 may control the communicator 160 to provide the user terminal with a guide for the movement of the vehicle 1, and may move. Also, the vehicle 1 provides the user terminal with the guide for the movement of the vehicle 1, and when no response is received from the user terminal for a predetermined period of time, the vehicle 1 may move to another place other than the current location. The guide for the movement of the vehicle 1 may allow the user to select the movement of the vehicle 1 or allow the user to select one from the retrieved parking lots. Despite the guide, when no response is received from the user terminal, the vehicle 1 may move automatically to secure an entry of the emergency vehicle 3 on a narrow road.

When the vehicle 1 completes the movement to the other place (e.g. the parking lot selected by the user) other than the current location, the vehicle 1 may control the communicator 160 to notify the user terminal of the completion of the movement (705).

When the movement mode is off (702), the vehicle 1 may remain parked (or stopped) (706). In this instance, the vehicle 1 may provide a message informing that the emergency vehicle 3 is approaching through the user terminal, so that the user may directly move the vehicle 1.

As is apparent from the above, according to the exemplary embodiments of the disclosure, the vehicle and the control method thereof can provide a smooth traffic flow because the autonomous vehicle does not disrupt the driving of an emergency vehicle, and also the autonomous vehicle can drive efficiently by avoiding the emergency vehicle.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although exemplary embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A control method of a vehicle comprising a communicator configured to receive emergency vehicle information from outside the vehicle, the control method comprising:

receiving the emergency vehicle information while the vehicle is parked or stopped, acquiring an emergency route of an emergency vehicle from the emergency vehicle information;

acquiring a current location of the vehicle, and when the current location of the vehicle is included in the emergency route, controlling the vehicle to move to a location other than the current location;

wherein the controlling of the vehicle to move to the location other than the current location comprises:

providing a guide for a movement of the vehicle to a user terminal; and controlling the vehicle to automatically move to the location other than the current location based on a response which is not received for a predetermined period of time from the user terminal.

2. The control method of claim 1, further comprising:

controlling the communicator to provide a user terminal with a message about the emergency vehicle, when the current location of the vehicle is included in the emergency route.

3. The control method of claim 2, wherein the message includes selection information to guide a user on a movement of the vehicle.

4. The control method of claim 3, further comprising:

moving the vehicle, when the user allows the vehicle to move in response to the selection information.

5. The control method of claim 2, further comprising:

searching for a nearby parking lot based on the current location of the vehicle; and controlling the communicator to output the nearby parking lot on the user terminal.

6. The control method of claim 5, further comprising:

receiving a user's selection on the nearby parking lot, and controlling the vehicle to move to the selected parking lot.

7. The control method of claim 6, further comprising:

controlling the communicator to output a movement completion notification on the user terminal, when a movement of the vehicle to the selected parking lot is completed.

8. The control method of claim 1, further comprising:

receiving an on/off input with respect to a movement mode based on the emergency vehicle information from a user; and controlling the vehicle to move to the location other than the current location, when the movement mode is on.

9. The control method of claim 1, further comprising:

identifying a width of a road of the current location of the vehicle; and controlling the vehicle not to move, when the width of the road is equal to or greater than a predetermined length.

\* \* \* \* \*